United States Patent

Kitahata et al.

Patent Number: 4,770,933
Date of Patent: Sep. 13, 1988

[54] MAGNETIC RECORDING MEDIUM

[75] Inventors: Shinichi Kitahata; Mikio Kishimoto, both of Osaka, Japan

[73] Assignee: Hitachi Maxell, Ltd., Osaka, Japan

[21] Appl. No.: 142,685

[22] Filed: Jan. 11, 1988

[30] Foreign Application Priority Data

Jan. 9, 1987 [JP] Japan .................................. 62-2819

[51] Int. Cl.$^4$ .............................................. G11B 5/70
[52] U.S. Cl. .................................. 428/323; 252/62.54; 252/62.59; 252/62.63; 252/62.64; 428/402; 428/694; 428/900
[58] Field of Search ............... 428/323, 402, 694, 900; 252/62.54, 62.56, 62.59, 62.63, 62.64

[56] References Cited

U.S. PATENT DOCUMENTS 4,425,250 1/1984 Hibst .............................. 252/62.59
4,511,617 4/1985 Hideyama et al. ............... 428/694

Primary Examiner—Paul J. Thibodeau
Attorney, Agent, or Firm—Birch, Stewart, Kolasch & Birch

[57] ABSTRACT

A magnetic recording medium which comprises a substrate and a magnetic layer comprising hexagonal system ferrite powder of the formula:

$$AO \cdot n\{[Fe_{1-(x+y)} \cdot M^{2+}_x \cdot M^{4+}_y]_2 O_3\} \quad (I)$$

wherein,
A is at least one metal selected from the group consisting of Ba, Sr, Pb and Ca,
$M^{2+}$ is at least one divalent metal ion selected from the group consisting of Mn, Co, Ni, Cu, Zn and Mg,
$M^{4+}$ is at least one tetravalent metal ion selected from the group consisting of Ti, Zr, Sn, Ge, V and Nb,
n is a number of 3 to 8,
x and y are such numbers that $x+y$ is from 0.02 to 0.3 and $x/y$ is from 0.2 to 0.8.,
and which has a temperature dependency such that the coercive force of the magnetic layer is at a minimum in the temperature range of $-20°$ to $50°$ C. and has a higher coercive force outside said temperature range has good storage property.

2 Claims, 2 Drawing Sheets

MAGNETIC RECORDING MEDIUM

BACKGROUND OF THE INVENTION

1. Field of the Invention

The present invention relates to a magnetic recording medium such as a magnetic tape and magnetic disc, in which a hexagonal system ferrite powder is used as a recording element.

2. Description of the Prior Arts

Requirement for a high density recording of a magnetic recording medium increases year by year. A horizontal recording medium in which acicular magnetic powder is orientated in a magnetic layer has a disadvantage that a rotational demagnetization significantly increases as a recording density is increased. At present, therefore, a vertical magnetic recording medium in which signals are recorded in a vertical direction to a magnetic layer has been developed.

As a magnetic layer formed in such a vertical magnetic recording medium, a layer which is formed by painting platelet particles of hexagonal system ferrite powder, orientating them in parallel to a medium surface is considered to have better properties, such as productivity and durability, than a thin metal layer consisting of a magnetic metal such as Co-Cr.

However, a conventional magnetic recording medium using the hexagonal system ferrite powder has a fatal disadvantage that it has an unsatisfactory storage property since an output of recorded signals attenuates, namely so called "demagnetization by cooling" occurs, when the recording medium is subjected to a low temperature and reproduced at room temperature after signals are recorded.

SUMMARY OF THE INVENTION

An object of the present invention is to provide a magnetic recording medium with an improved storage property, which does not have the disadvantage of the conventional magnetic recording medium using hexagonal system ferrite powder as the recording element.

In the course of study to overcome such disadvantages, it has been discovered that coercive force of the magnetic recording medium using the hexagonal system ferrite powder greatly varies with a storage temperature and shows such temperature dependency that the coercive force is high in a low and high temperature range and minimum in a moderate temperature range. In addition, it has been also discovered that, in the conventional magnetic recording medium of this type, since the coercive force is minimum at a temperature below $-20°$ C., it decreases as the temperature decreases in the room temperature range, which causes the demagnetization by cooling.

In view of such findings, various magnetic recording mediums which exhibit various temperature dependency of the coercive force have been produced by varying a chemical composition of hexagonal system ferrite powder and the like, and a relationship between the demagnetization by cooling of the medium and the above temperature dependency has been studied. Then it is found that the medium which exhibits such temperature dependency that the coercive force is minimum in a specified temperature range, has significantly reduced demagnetization by cooling, present invention.

Thus, the provides a magnetic recording medium which has a magnetic layer comprising a hexagonal system ferrite powder on a substrate, and is characterized in that the magnetic recording medium exhibits a temperature dependency that a coercive force of the magnetic layer is high at a low and high temperature range and minimum at a moderate temperature range, and a coercive force is minimum at a temperature between $-20°$ and $50°$ C.

According to the present invention, there is provided a magnetic recording medium which comprises a substrate and a magnetic layer comprising hexagonal system ferrite powder of the formula:

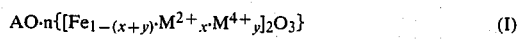

$$AO \cdot n\{[Fe_{1-(x+y)} \cdot M^{2+}{}_x \cdot M^{4+}{}_y]_2 O_3\} \quad (I)$$

wherein

A is at least one metal selected from the group consisting of Ba, Sr, Pb and Ca, $M^{2+}$ is at least one divalent metal ion selected from the group consisting of Mn, Co, Ni, Cu, Zn and Mg, $M^{4+}$ is at least one tetravalent metal ion selected from the group consisting of Ti, Zr, Sn, Ge, V and Nb, n is a number of 3 to 8, x and y are such numbers that $x+y$ is from 0.02 to 0.3 and $x/y$ is from 0.2 to 0.8., and which has a temperature dependency such that the coercive force of the magnetic layer is at a minimum in the temperature range of $-20°$ to $50°$ C. and has a higher coercive force outside of this temperature range.

DETAILED DESCRIPTION OF THE INVENTION

Figure 1:
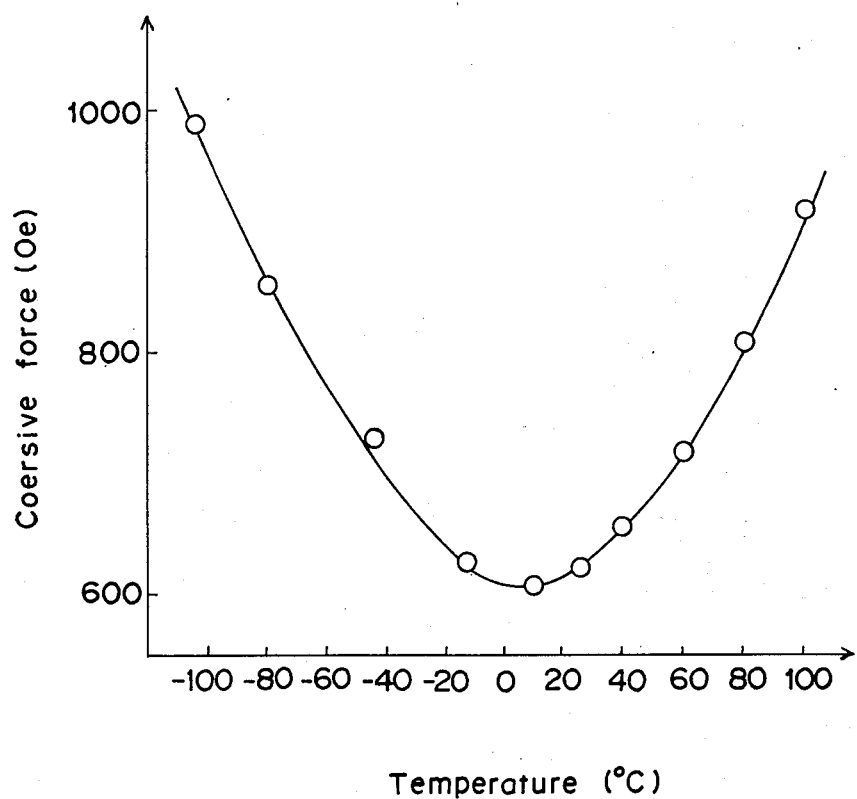
FIG. 1 is a graph which shows temperature dependency of the coercive force of the magnetic recording medium according to the present invention.
Figure 2:
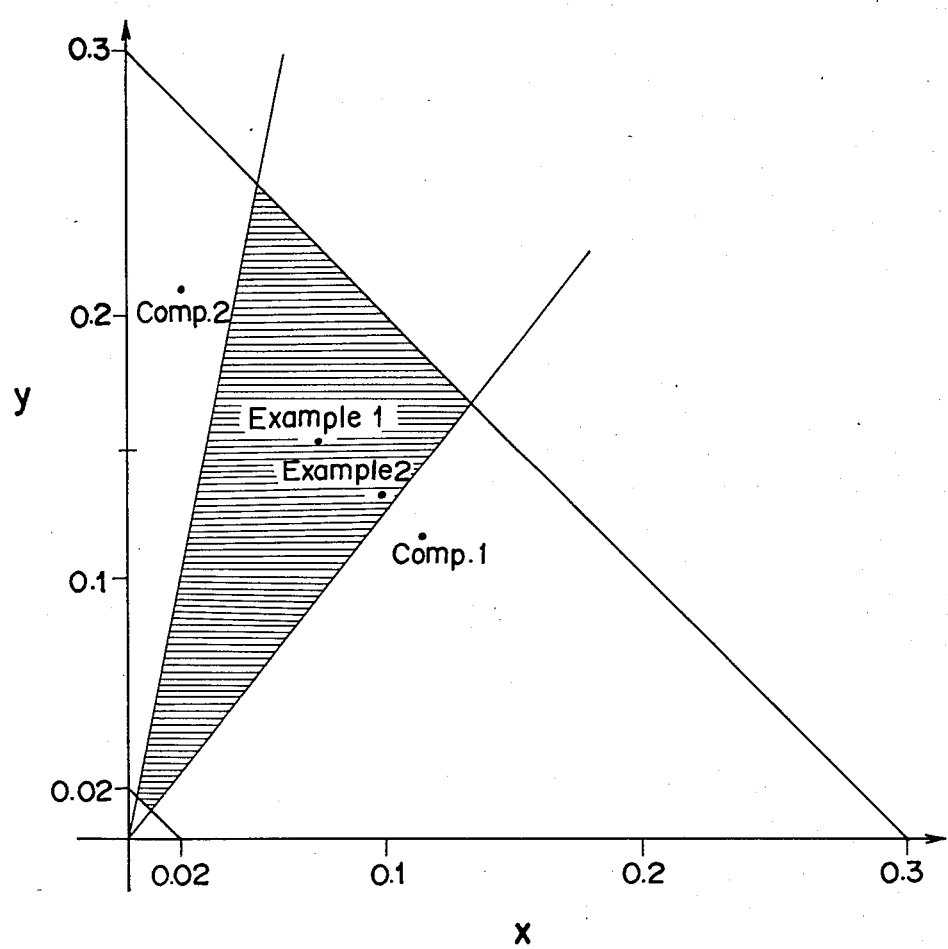
FIG. 2 is a graph showing ranges of $M^{2+}$ (x) and $M^{4+}$ (y) which give hexagonal system ferrite powder to be used according to the present invention.

The magnetic recording medium of the present invention is characterized in that it exhibits such temperature dependency that the coercive force is minimum in the moderate temperature range, namely in a temperature range of $-20°$ to $50°$ C. FIG. 1 shows the temperature dependency of the coercive force in the magnetic recording medium produced in Example 1 of the present invention, in which the coercive force is minimum at $10°$ C.

As is clear from FIG. 1, since the medium exhibiting the above temperature dependency has a small change of the coercive force in the room temperature range and the coercive force is not deteriorated as atmospheric temperature is lowered, demagnetization by cooling is significantly suppressed. Further, since the change of the coercive force is small, demagnetization by heating is also suppressed. Thus, since the medium of the present invention has small change of the coercive force caused by the temperature change near room temperature, it has good storage property when it is used in a circumstance that the temperature significantly changes according to seasons such as in Japan or according to location.

In contrast, in the conventional magnetic recording medium in which the coercive force is minimum at a temperature lower than $-20°$ C., usually not higher than $-100°$ C., the coercive force greatly decreases as the temperature decreases in the room temperature range, and the demagnetization by cooling significantly occurs. This is easily recognized by shifting the coercive force curve of FIG. 1 to the left direction, namely to the direction of lower temperature. In the medium in which the coercive force is minimum at a temperature higher than 50° C., the coercive force greatly decreases in the room temperature range as the temperature increases, and the demagnetization by heating significantly occurs.

In the magnetic recording medium of the present invention, the demagnetization by cooling is suppressed and no demagnetization by heating occurs. Therefore, the medium has good storage property. Among the mediums, one having the minimum coercive force in the temperature of $-10°$ to $+30°$ C. is most suitable.

The magnetic recording medium of the present invention is easily produced by selecting the chemical composition of the hexagonal system ferrite powder which is used as the recording element. The suitable ferrite powder is expressed by the formula:

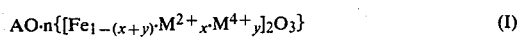
(I)

wherein,

A, $M^{2+}$, $M^{4+}$, n, x and y are the same as defined above.

When $x+y$ which corresponds to a proportion of substituted iron is smaller than 0.02, an effect of decreasing the coercive force is small. When it is larger than 0.3, it is difficult to hold the easily magnetized axis in vertical direction to the platelet surface, and magnetization component in vertical direction to the medium is insufficient.

When a ratio of the $M^{2+}$ and $M^{4+}$ (x/y) is in the range of 0.2 to 0.8, the medium has good storage property. That is, the medium exhibits such temperature dependency that the coercive force is minimum at a temperature between $-20°$ and 50° C. and has reduced demagnetization by cooling heating. When the ratio (x/y) is in the range of 0.3 to 0.6, the medium exhibits such temperature dependency that the coercive force is minimum at a temperature between $-10°$ and 30° C. and it has very good storage property.

When the ratio (x/y) is larger than 0.8, the medium exhibits such storage property that the coercive force is minimum at a temperature lower than $-20°$ C., thus it has large demagnetization by cooling. The conventional magnetic recording medium uses the hexagonal system ferrite powder in which x/y is usually 1, therefore, it is considered to have the significant problem of demagnetization by cooling. When x/y is smaller than 0.2, the medium exhibits such storage property that the coercive force is minimum at the temperature higher than 50° C., thus it often has the problem of demagnetization by heating.

By using, as the recording element, the hexagonal system ferrite powder which has such chemical composition that the ratio of x and y (x/y) in the above formula is from 0.2 to 0.8, preferably from 0.3 to 0.6, the magnetic recording medium with good storage property is easily obtained.

The coercive force of the ferrite powder is preferably in the range of 200 to 2,000 Oe. When the coercive force is smaller than 200 Oe, the high density recording cannot be realized. When it is larger than 2,000 Oe, the ferrite powder is not suitable as the recording element of the magnetic recording medium. A hexagonal platelet of the ferrite powder preferably has an average length along major axis of 0.02 to 0.5 μm. When the average length along major axis is smaller than 0.02 μm, it is difficult for the ferrite powder to have sufficient magnetism. When it is larger than 0.5 μm, the surface smoothness of the magnetic layer is worsened and the high density recording cannot be realized.

The hexagonal system ferrite powder is prepared by using a specified amount of a compound such as chloride which contains each metal (Fe, A, $M^{2+}$, and $M^{4+}$) of the formula (I). An aqueous solution of the compound is added to an aqueous alkaline solution and mixed to form a precipitate, which is heated at the temperature of 150° to 300° C. for 1 to 6 hours. A reaction product is washed, filtered, dried and thermally treated at 400° to 1,000° C. for several hours so as to improve the magnetic properties.

The magnetic recording medium of the present invention can be prepared, for example, by mixing and dispersing the hexagonal system ferrite powder with a binder resin, an organic solvent and other additives to prepare a magnetic paint, coating the paint on a substrate such as a polyester film with any coating means such as roll coater, and drying it to form a magnetic layer.

Preferably, the magnetic paint containing the hexagonal system ferrite powder is magnetically orientated by applying a magnetic field in a vertical direction to the magnetic layer after it is coated on the substrate, whereby a magnetic easy axis is readily orientated in the vertical direction and the magnetic layer has good surface smoothness.

The binder resin may be a conventional binder resin such as vinyl chloride/vinyl acetate copolymers, polyvinyl butyral resins, cellulose resins, polyurethane resins, isocyanate compounds and radiation-curable resins.

The organic solvent may be a conventional organic solvent such as toluene, methyl ethyl ketone, methyl isobutyl ketone, cyclohexanone, tetrahydrofuran, ethyl acetate, and mixtures thereof.

The magnetic paint may incorporate various conventional additives such as a dispersant, lubricant, abrasive or antistatic agent.

The present invention provides the magnetic recording medium which suffers from no demagnetization by cooling and less demagnetization by heating, and has good storage property.

PREFERRED EMBODIMENTS

The present invention will be hereinafter explained further in detail by following examples, wherein parts are by weight unless otherwise indicated.

EXAMPLE 1

| | |
|---|---|
| BaCl$_2$.2H$_2$O | 21.3 g |
| FeCl$_3$.6H$_2$O | 216 g |
| CoCl$_2$.6H$_2$O | 19.6 g |
| TiCl$_4$ | 31 g |

The above components were dissolved in one liter of water and mixed with a 1N aqueous solution of sodium hydroxide to prepare a precipitate. The precipitate was hydrothermally reacted at 300° C. for 2 hours in an autoclave. A resultant reaction product was washed with water, filtered and dried, and then thermally treated in the air at 500° C. for 4 hours to prepare a hexagonal Ba ferrite powder, which is expressed by the formula (I) in which A is Ba, $M^{2+}$ is Co$^{2+}$, $M^{4+}$ is Ti$^{4+}$, n is 6, x+y is 0.23 and x/y is 0.5 (thus x is 0.0766 and y is 0.1533). A coercive force was 770 Oe, a saturation magnetization was 52 emu/g and an average length along major axis was 0.008 μm.

The magnetic paint was prepared by mixing the resultant ferrite powder with the following components for three days in a ball mill:

| | |
|---|---|
| Hexagonal Ba ferrite powder | 1,000 parts |
| Vinyl chloride/vinyl acetate/vinyl alcohol copolymer (VAGH, a trade name of U.C.C., U.S.A.) | 137.5 parts |
| Polyurethane resin (Pandex T5201, a trade name of Dainippon Ink Chemical Co., Japan) | 87.5 parts |
| Trifunctional low molecular weight isocyanate compound (Colonate L, a trade name of Nippon Polyurethane Ind., Japan) | 25 parts |
| Cr$_2$O$_3$ powder | 15 parts |
| Lauric acid | 20 parts |
| Liquid paraffin | 2 parts |
| Methyl isobutyl ketone | 800 parts |
| Toluene | 800 parts |

With applying a magnetic field of 3,000 Oe in the vertical direction, the magnetic paint was coated on a substrate of a polyester film having a thickness of 12 μm and dried to form a magnetic layer having a thickness of 4 μm. Then, the coated substrate was subjected to a smoothing treatment and cut into a desired width to prepare a magnetic tape of the present invention. A temperature dependency of the coercive force in the magnetic tape was determined and is as shown in FIG. 1. The coercive force was minimum at 10° C.

EXAMPLE 2

In the same manner as in Example 1 but using 25 g of CoCl$_2$·6H$_2$O and 26.8 g of TiCl$_4$ in the preparation of the hexagonal Ba ferrite powder, the hexagonal Ba ferrite powder was obtained, which is expressed by the formula (I) in which A is Ba, M$^{2+}$ is Co$^{2+}$, M$^{4+}$ is Ti$^{4+}$, n is 6, x+y is 0.23 and x/y is 0.75 (thus x is 0.0986 and y is 0.1314). It had the coercive force of 550 Oe, the saturation magnetization of 51 emu/g and the average length along major axis of 0.08 μm.

In the same manner as in Example 1, a magnetic tape of the present invention was prepared by using this ferrite powder. The temperature dependency of the coercive force was determined. It was almost the same as the dependency in Example 1 except that the coercive force curve of FIG. 1 is shifted to the direction of lower temperature so that the coercive force is minimum at −16° C.

COMPARATIVE EXAMPLE 1

In the same manner as in Example 1 but using 30.3 g of CoCl$_2$·6H$_2$O and 24 g of TiCl$_4$ in the preparation of the hexagonal Ba ferrite powder, the hexagonal Ba ferrite powder was obtained. The powder is expressed by the formula (I) in which A is Ba, M$^{2+}$ is Co$^{2+}$, M$^{4+}$ is Ti$^{4+}$, n is 6, x+y is 0.23 and x/y is 1.0 (thus x is 0.115 and y is 0.115), and it had the coercive force of 630 Oe, the saturation magnetization of 56 emu/g and the average length along major axis of 0.09 μm.

In the same manner as in Example 1, a magnetic tape for comparison was prepared by using this ferrite powder. The dependency of the coercive force on the temperature was determined, and it was different from that in Example 1 such that the coercive force curve of FIG. 1 is greatly shifted to the direction of lower temperature and the coercive force is minimum at −130° C.

COMPARATIVE EXAMPLE 2

In the same manner as in Example 1 but using 5.4 g of CoCl$_2$·6H$_2$O and 42.3 g of TiCl$_4$, the hexagonal Ba ferrite powder was obtained. The powder is expressed by the formula (I) in which A is Ba, M$^{2+}$ is Co$^{2+}$, M$^{4+}$ is Ti$^{4+}$, n is 6, x+y is 0.23 and x/y is 0.10 (thus x is 0.021 and y is 0.209) and had the coercive force of 500 Oe, the saturation magnetization of 51.5 emu/g and the average major axis length of 0.09 μm.

In the same manner as Example 1, a magnetic tape for comparison was prepared by using this ferrite powder. The dependency of the coercive force on the temperature was determined, and it was different from that in Example 1 such that the coercive force curve of FIG. 1 is greatly shifted to the direction of higher temperature and the coercive force is minimum at 130° C.

In each magnetic tape of Examples 1 and 2 and Comparative Examples 1 and 2, decrease of residual magnetic flux density was determined when the tape was stored at the temperature of −20°, 0° or 60° C. for 2 hours. The decrease of residual magnetic flux density (%) and the coercive force at 20° C. are shown in Table 1.

TABLE 1

| Example No. | Coercive force at 20° C. (Oe) | Decrease of residual magnetic flux density (%) | | |
|---|---|---|---|---|
| | | −20° C. | 0° C., | 60° C. |
| 1 | 780 | 1.2 | 0.8 | 2.2 |
| 2 | 590 | 3.5 | 1.8 | 2.5 |
| Comp. 1 | 650 | 23.5 | 11.5 | 0.9 |
| Comp. 2 | 550 | 1.0 | 1.4 | 8.5 |

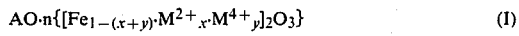

As apparent from the results of Table 1, the magnetic tape of the present invention suffers from no demagnetization by cooling, which is found in the conventional tape (Comparative Example 1) and less demagnetization by heating, and has better storage property.

The invention being thus described, it will be obvious that the same may be varied in many ways, Such variations are not to be regarded as a departure from the spirit and scope of the present invention, and all such modifications as would be obvious to one skilled in the art are intended to be included within the scope of the following claims.

What is claimed is:

1. A magnetic recording medium which comprises a substrate and a magnetic layer comprising hexagonal system ferrite powder of the formula:

$$AO \cdot n\{[Fe_{1-(x+y)} \cdot M^{2+}{}_x \cdot M^{4+}{}_y]_2 O_3\} \quad (I)$$

wherein,

A is at least one metal selected from the group consisting of Ba, Sr, Pb and Ca, M$^{2+}$ is at least one divalent metal ion selected from the group consisting of Mn, Co, Ni, Cu, Zn and Mg, M$^{4+}$ is at least one tetravalent metal ion selected from the group consisting of Ti, Zr, Sn, Ge, V and Nb, n is a number of 3 to 8, x and y are such numbers that x+y is from 0.02 to 0.3 and x/y is from 0.2 to 0.8., and which has a temperature dependency such that the coercive force of the magnetic layer is at a minimum in the temperature range of −20° to 50° C. and has a higher coercive force outside of said temperature range.

2. The magnetic recording medium according to claim 1, wherein the ratio x/y is from 0.3 to 0.6 and the coercive force is minimum in the temperature range of −10° to 30° C.

* * * * *